(12) United States Patent
Han et al.

(10) Patent No.: US 9,519,376 B2
(45) Date of Patent: Dec. 13, 2016

(54) METHOD AND ELECTRONIC DEVICE FOR PROCESSING FINGER MOTION

(71) Applicant: Samsung Electronics Co., Ltd., Gyeonggi-do (KR)

(72) Inventors: Jae-Ryong Han, Gyeonggi-do (KR); Kwang-Min Kil, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/530,513

(22) Filed: Oct. 31, 2014

(65) Prior Publication Data

US 2015/0116249 A1    Apr. 30, 2015

(30) Foreign Application Priority Data

Oct. 31, 2013    (KR) .................. 10-2013-0131716

(51) Int. Cl.
  *G06F 3/041*    (2006.01)
  *G06K 9/00*    (2006.01)

(52) U.S. Cl.
  CPC ......... *G06F 3/0416* (2013.01); *G06K 9/00013* (2013.01); *G06K 9/00026* (2013.01); *G06K 9/00355* (2013.01)

(58) Field of Classification Search
  CPC .... G06F 3/04865; G06F 3/0487; G06F 3/044; G06F 3/04875; G06F 3/045
  USPC ................ 345/173–179; 178/18.01–18.04
  See application file for complete search history.

(56) References Cited

U.S. PATENT DOCUMENTS

| 7,697,729 | B2 * | 4/2010 | Howell .................. G06F 3/011 345/156 |
| 2012/0127179 | A1 * | 5/2012 | Aspelin .................. G06F 21/32 345/441 |
| 2014/0341446 | A1 * | 11/2014 | Hare ..................... G06F 3/0416 382/124 |

FOREIGN PATENT DOCUMENTS

KR    10-2011-0044086    4/2011

\* cited by examiner

*Primary Examiner* — Kimnhung Nguyen

(57) ABSTRACT

A method in an electronic device includes displaying an image on a screen, detecting a swiping of a finger through a sensor, and selecting at least a portion of the image based on the swiping of the finger. An electronic device is provided. The electronic device includes a memory configured to store one or more pieces of fingerprint information, a screen configured to display an image, and at least one processor configured to detect a swiping of a finger through a sensor, and select at least a portion of the image based on the swiping of the finger. Other various embodiments are also disclosed.

20 Claims, 11 Drawing Sheets

Image data 410

METHOD AND ELECTRONIC DEVICE FOR PROCESSING FINGER MOTION

PRIORITY

The present application is related to and claims priority under 35 U.S.C. §119 of a Korean patent application No. 10-2013-0131716 filed in the Korean Intellectual Property Office on Oct. 31, 2013, the entire disclosure of which is hereby incorporated by reference.

TECHNICAL FIELD

The present disclosure relates to a method for processing input data and an electronic device thereof.

BACKGROUND

With the development of information communication technology and semiconductor technology, various types of electronic devices have been developed into multimedia devices for providing various multimedia services. For example, the electronic devices are capable of providing multimedia services, such as a voice call service, a video call service, a messenger service, a broadcasting service, a wireless Internet service, a camera service, and a music playback service.

As described above, the electronic device may provide various multimedia services. However, a user of the electronic device demands a new service through the electronic device. Therefore, there is a need for an electronic device providing a service for satisfying the user's various desires.

SUMMARY

A method in an electronic device is provided. The method includes displaying an image on a screen, detecting a swiping of a finger through a sensor, and selecting at least a portion of the image based on the swiping of the finger.

In some embodiments, the finger is swiped in one of an up-to-down direction, a down-to-up direction, a left-to-right direction or a right-to-left direction.

In some embodiments, a size of the image is determined according to a speed of the swiping of the finger.

In some embodiments, the size of the selected image is increased as the speed of the swipe of the finger is faster.

In some embodiments, a size of the selected image is decreased when a direction of the swiping switches from a first direction to a second direction.

In some embodiments, the method further includes scanning a fingerprint of the finger, and setting a fingerprint acquired from the finger as an identification code for unlocking the selected image.

In some embodiments, the method further includes providing an image of the fingerprint when the finger is swiped for unlocking the selected image.

In some embodiments, the method further includes requesting for a re-swiping the finger when the fingerprint information does not include a specified region of a fingerprint of a finger.

In some embodiments, the method further includes inquiring a user to confirm whether to use the scanned the fingerprint as an identification code when the finger is released off the sensor.

In some embodiments, the method further includes increasing or decreasing a selected region of the image when a second swiping is performed within a predetermined period of time after the swiping is released.

An electronic device is provided. The electronic device includes a memory configured to store one or more pieces of fingerprint information, a screen configured to display an image, and at least one processor configured to detect a swiping of a finger through a sensor, and select at least a portion of the image based on the swiping of the finger.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
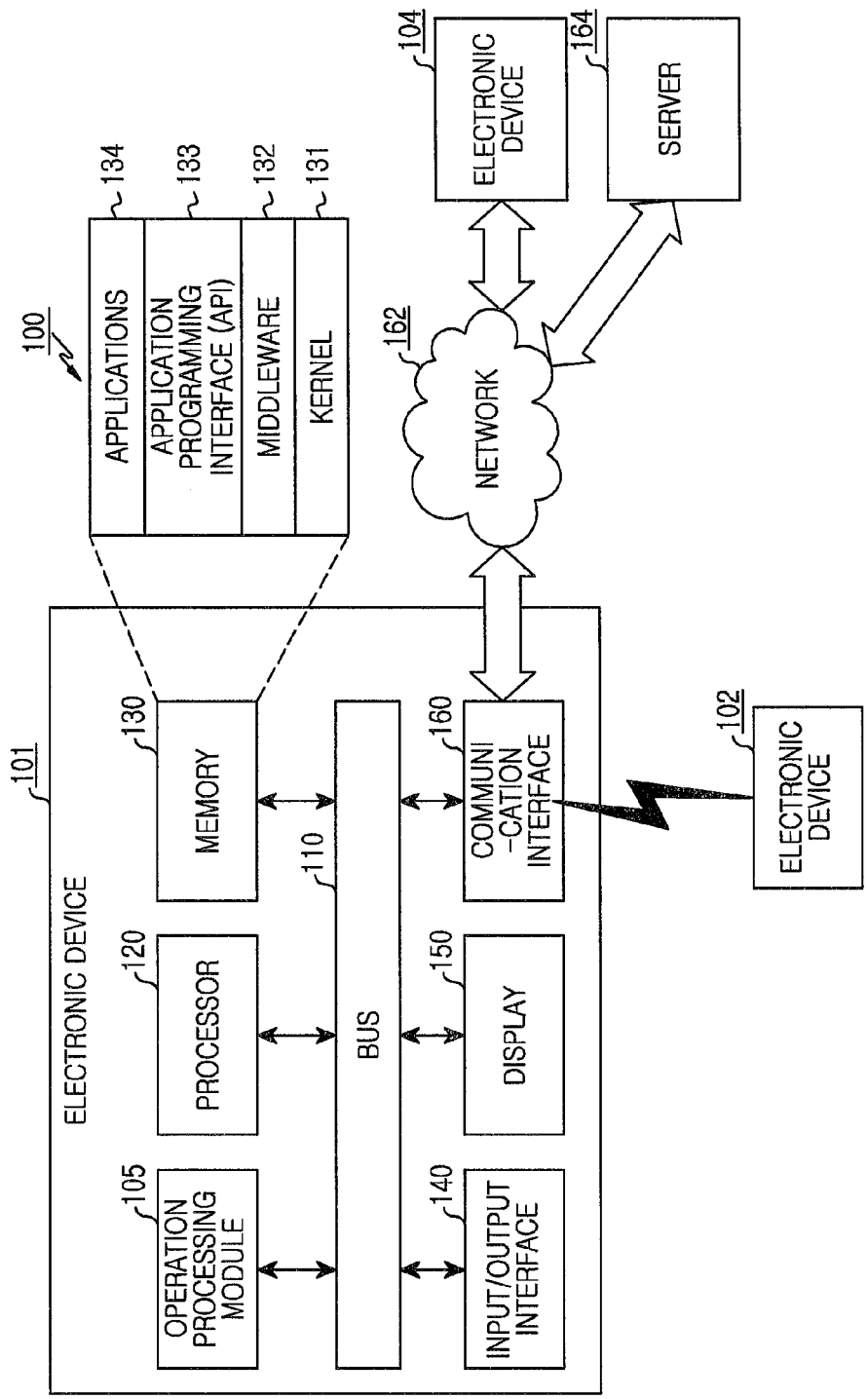
FIG. 1 is a block diagram 100 illustrating an electronic device 101 according to various embodiments.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Embodiments of the present disclosure will be described herein below with reference to the accompanying drawings. Exemplary embodiments are illustrated in the drawings and will be described below in detail, but the present disclosure may include various embodiments and modifications. It should be understood, however, that there is no intent to limit the disclosure to the particular forms disclosed, but on the contrary, the disclosure is to cover all modifications, equivalents, and alternatives falling within the spirit and scope of the disclosure. In the drawings, similar reference numerals denote similar elements. Moreover, detailed descriptions related to well-known functions or configurations will be ruled out in order not to unnecessarily obscure subject matters of the present disclosure. In the following description, only parts necessary to understand operations according to various embodiments of the present disclosure will be described, and other parts are omitted for clarity and conciseness.

The terms such as "includes" and "may include" when used herein, specify the presence of stated features, operations, or elements, but do not limit one or more additional functions, operations or elements. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

An electronic device according to the present disclosure can be a device having a communication function. Examples of the electronic device can include at least one of a smart phone, a tablet personal computer (PC), a mobile telephone, a video telephone, an e-book reader, a desktop PC, a laptop PC, a netbook computer, a personal digital assistant (PDA), a portable multimedia player (PMP), a MP3 player, a mobile medical equipment, a camera, and a wearable device (for example, at least one of a head-mounted-device (HMD), such as electronic glasses, an electronic bracelet, an electronic necklace, an electronic accessory, and a smart watch).

According to some embodiments, the electronic device can be smart home appliances with a communication function. Examples of the smart appliance can include at least one of a television (TV), a digital versatile disk (DVD) player, an audio system, a refrigerator, an air-conditioner, a cleaner, an oven, a microwave oven, a washing machine, an air cleaner, a set-top box, a TV box (for example, Samsung HomeSync™, Apple TV™, or Google TV™), a game console, an electronic dictionary, an electronic key, a camcorder, and a digital photo frame.

In some embodiments, the electronic device can include at least one of various medical equipments (for example, an MRA (magnetic resonance angiography) imaging apparatus, an MRI (magnetic resonance imaging) apparatus, a CT (computed tomography) imaging apparatus, and an ultrasound imaging apparatus)), a navigation device, a GPS receiver, an event data recorder (EDR), a flight data recorder (FDR), a vehicle infotainment device, a ship electronic equipment (for example, a ship navigation device or a gyro-compass device), an avionics device, and a security equipment.

In some embodiments, the electronic device can include at least one of a furniture or a part of a building/structure which includes a communication function, an electronic board, an electronic signature receiving device, a protector, and various meters (for example, water, electricity, gas or radio waves). The electronic device according to the present disclosure can be a combination of one or more of the above-described devices. It is obvious to those skilled in the art that the electronic device according to the present disclosure is not limited to the above-described devices. The electronic device according to various embodiments is described below with reference to accompanying drawings. The term "user" as used herein can be intended to include a human being using an electronic device and an apparatus (an intelligent electronic device) using an electronic device.

FIG. 1 is a block diagram 100 illustrating an electronic device 101 according to various embodiments.

Referring to FIG. 1, the electronic device 101 can include an operation processing module 105, a bus 110, a processor 120, a memory 130, an input/output interface 140, a display module 150, or a communication interface 160.

The operation processing module 105 can include a fingerprint sensing module 301 for recognizing a finger (for example, swiping of a finger) and detecting a fingerprint, or can be connected to a fingerprint sensing module of the electronic device 101. The operation processing module 105 can perform control to recognize a fingerprint of a finger when a fingerprint side of the finger is swiped up to down, down to up, left to right, or right to left on a plane surface of the fingerprint sensing module 301. The operation processing module 105 can perform control to detect a motion of enabling a finger of a user to be recognized through the fingerprint sensing module. The operation processing module 105 can perform control to detect a swipe speed at which the user swipes the finger on the fingerprint sensing module.

The operation processing module 105 can perform control to acquire an image generated by capturing a layer displayed on the display module 150 of the electronic device 101 according to a method of recognizing a finger in the fingerprint sensing module 301. The operation processing module 105 can perform control to determine a capture region on the layer displayed on the display module 150 of the electronic device 101 according to a region on which a fingerprint of a finger is acquired in the fingerprint sensing module 301. The operation processing module 105 can perform control to change a speed at which a capture region is determined ((for example, increased or decreased) on the layer displayed on the display module 150 of the electronic device 101 according to a speed (for example, a swipe speed at which a finger is swiped) of acquiring a fingerprint in the fingerprint sensing module 301. The operation processing module 105 can perform control to use the fingerprint acquired when the image is captured as an identification code for image viewing.

The operation processing module 105 can perform control to provide the image captured through the fingerprint sensing module 301 and to provide a menu of requesting input of the fingerprint acquired at the time of capturing an image when the image is viewed. The operation processing module 105 can perform control to provide a relevant image when the fingerprint input through the fingerprint sensing module 301 is identical to the fingerprint acquired at the time of capturing the image.

The bus 110 can be a circuit that connects the above-described elements to one another and transfers communication (for example, control message) between the above-described elements.

The processor 120 can receive a command from the above-described component (for example, the memory 130, the input/output interface 140, the display module 150, or the communication module 160) through, for example, the bus 110, decode the received command, and perform data operations or data processing according to the decoded command.

The memory 130 (for example, memory 125) can store a command or data received from or generated by the processor 120 or other elements (for example, the input/output interface 140, the display module 150, or the communication interface 160). The memory 130 can include programming modules, for example, a kernel 131, middleware 132, an application programming interface (API) 133, or applications 134. The above programming modules can be configured by software, firmware, hardware, or a combination of at least two thereof.

The kernel 131 can control or manage system resources (for example, the bus 110, the processor 120, or the memory 130) used to execute an operation or function implemented by the other programming modules, for example, the middleware 132, the API 133, or the application 134. The kernel 131 can provide an interface that allows the middle 132, the API 133 or the application 134 to access and then control or manage respective elements of the electronic device 101.

The middleware 132 can perform a relay function such that the API 133 or the application 134 communicates with the kernel 131 for transmission and reception of data. In addition, the middleware 132 can perform load balancing of task requests received from a plurality of applications 134 in such a way that a priority of using the system resources (for example, the bus 110, the processor 120, or the memory 130) of the electronic device 101 is assigned to at least one application of the plurality of applications 134 according to the task requests.

The API 133 is an interface for enabling the applications 134 to control functions provided by the kernel 131 or the middleware 132 and includes, for example, at least one interface or function for file control, window control, image processing, or character control.

The input/output interface 140 can receive a command or data from, for example, a user and transfer the command or data to the processor 120 or the memory 130 through the bus 110. The display module 150 can display moving images, an image, or data to the user. According to an embodiment, when a touchscreen panel is provided as the display module 150, a command can be input through a gesture of touching or hovering (for example, inputting an indirect touch) the display module 150.

The communication interface 160 can connect communication between the electronic device 101 and an auxiliary electronic device 102, an electronic device 104, or a server 164. The communication interface 160 can support a predetermined near field communication protocol 162 (for example, WiFi, BT, NFC or a predetermined network communication (for example, Internet, LAN, WAN, telecommunication network, cellular network, satellite network, or POTS)). The electronic devices 102 and 104 can be a device identical to (for example, same type) or different from (for example, different type) the electronic device 101.

Figure 2:
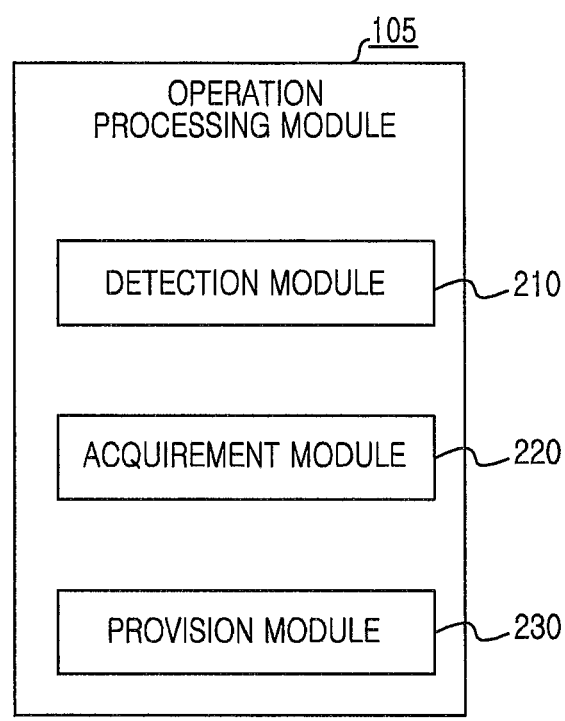
FIG. 2 illustrates an operation processing module 105 for an electronic device 101 according to various embodiments.

FIG. 2 illustrates an operation processing module 105 for an electronic device 101 according to various embodiments.

Referring to FIG. 2, the operation processing module 105 can include one or more of a detection module 210, an acquirement module 220, and a provision module 230.

Various embodiments for the respective modules will be described below.

The detection module 210 can include a fingerprint sensing module 301 for recognizing a finger (for example, swiping of a finger) and detect a fingerprint, or can be connected to a fingerprint sensing module of the electronic device 101. The detection module 210 can recognize a fingerprint of a finger when a fingerprint side of the finger is swiped up to down, down to up, left to right, or right to left on a plane surface of the fingerprint sensing module 301. The detection module 210 can detect a motion of enabling a finger of a user to be recognized through the fingerprint sensing module. The detection module 210 can detect a swipe speed at which the user swipes a finger on the fingerprint sensing module 301.

The acquirement module 230 can acquire an image generated by capturing a layer displayed on the display module 150 of the electronic device 101 according to a method of recognizing a finger in the detection module 210. The acquirement module 230 can determine a capture region on the layer displayed on the display module 150 of the electronic device 101 according to a region on which a fingerprint of a finger is acquired in the fingerprint sensing module 301. The acquirement module 230 can control a speed at which a capture region is determined (for example, increased or decreased) on the layer displayed on the display module 150 of the electronic device 101 according to a fingerprint acquirement speed (for example, a swipe speed at which a finger is swiped) in the fingerprint sensing module 301. The acquirement module 230 can perform setting to use the fingerprint acquired at the time of acquiring an image as an identification code for image viewing.

The provision module 250 can provide the image captured through the fingerprint sensing module 301 and provide a menu of inputting a fingerprint acquired at a time point which the image is captured when image viewing is requested. The provision module 250 can provide a relevant image when the fingerprint received through the fingerprint sensing module 301 is identical to the fingerprint acquired at the time of capturing the image.

Figure 3:
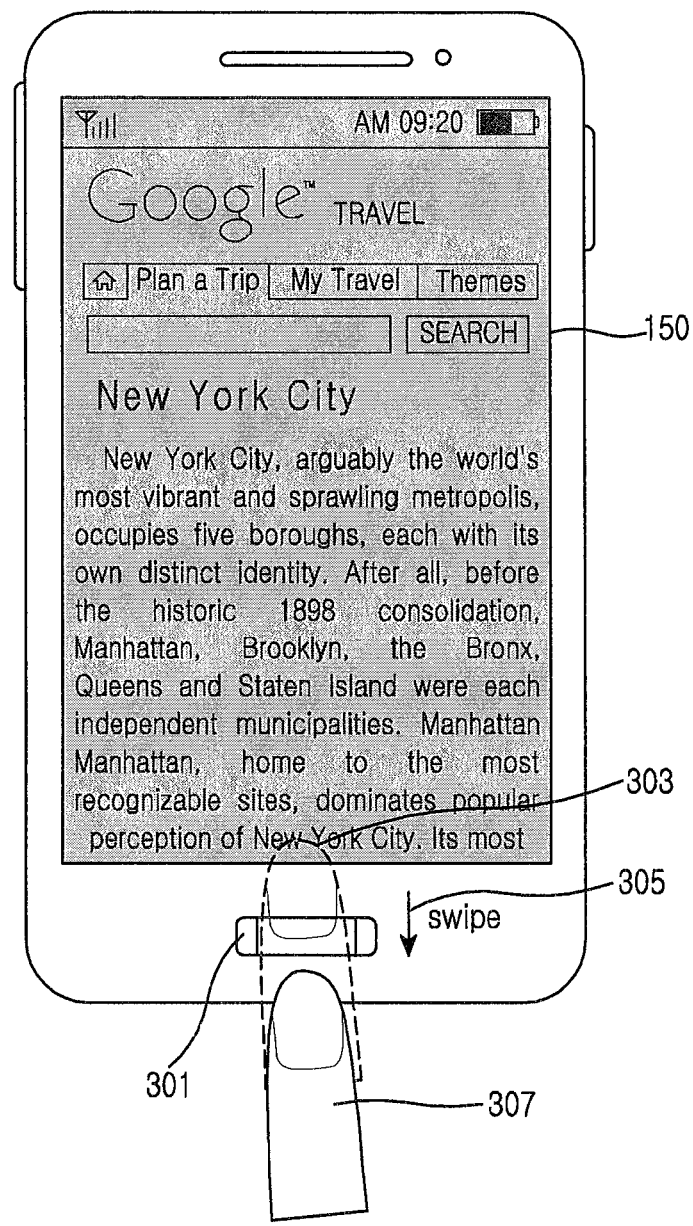
FIG. 3 illustrates an operation of capturing an image through a fingerprint sensing module 301 in an electronic device 101 according to various embodiments.

FIG. 3 illustrates an operation of capturing an image through a fingerprint sensing module 301 in an electronic device 101 according to various embodiments.

Referring to FIG. 3, the electronic device 101 can include one or more display modules 150 and one or more fingerprint sensing modules 301. The electronic device 101 can display objects associated with functions provided by the electronic device 101 through one or more layers on the display module 150 of the electronic device 191. The electronic device 101 can acquire fingerprints of one or more fingers of a user through the fingerprint sensing module. The user can enable a fingerprint to be recognized by swiping the fingerprint side of a finger up to down, down to up, left to right, or right to left on the fingerprint sensing module 150. The electronic device 101 can capture an entire region or a specified region of the layer displayed on the display module 150 of the electronic device 101 corresponding to the motion of enabling a fingerprint of a finger to be recognized by the fingerprint sensing module 301 in a capture mode.

Referring to FIG. 3, the entire or specified region of the layer displayed on the display module 150 of the electronic device 101 can be captured through the motion of enabling the fingerprint of the finger to be recognized by the fingerprint sensing module 301 included in the electronic device 101 in the capture mode of the electronic device 101. According to an embodiment, the electronic device 101 can detect swiping of the fingerprint side of a finger at a speed equal to or greater than a preset speed through the fingerprint sensing module 301. When there is a motion of enabling a fingerprint of a finger to be recognized by the fingerprint sensing module 301 by swiping the finger in an up-to down direction or a down-to-up direction at a speed equal to or greater than the preset speed on the fingerprint sensing module 301, the electronic device 101 can capture the entire region of a layer displayed on the display module 150 of the electronic device 101 at the time of releasing the contact of the finger with the fingerprint sensing module 301. Referring to FIG. 3, the fingerprint side of a finger 303 can be located on the fingerprint sensing module 301 of the electronic device 101 and the finger can be swiped in an up-to-down direction 305 at a speed equal to or greater than the speed preset in the operation processing module 105 of the electronic device 101. After the fingerprint side of the finger, which is equal to or larger than a predetermined area, is swiped on the fingerprint sensing module 30, the contact of the finger on the fingerprint sensing module 301 can be released as denoted by 307 in FIG. 3. When capturing and storing the layer displayed on the display module 150, the electronic device 101 can acquire the fingerprint that is recognized by the fingerprint sensing module 301, and store information on the acquired fingerprint in data of the captured image. When the fingerprint that is stored along with the image is received at the time of image viewing for the captured image through fingerprint recognition, the electronic device 101 can perform control to provide the image.

Figure 4:
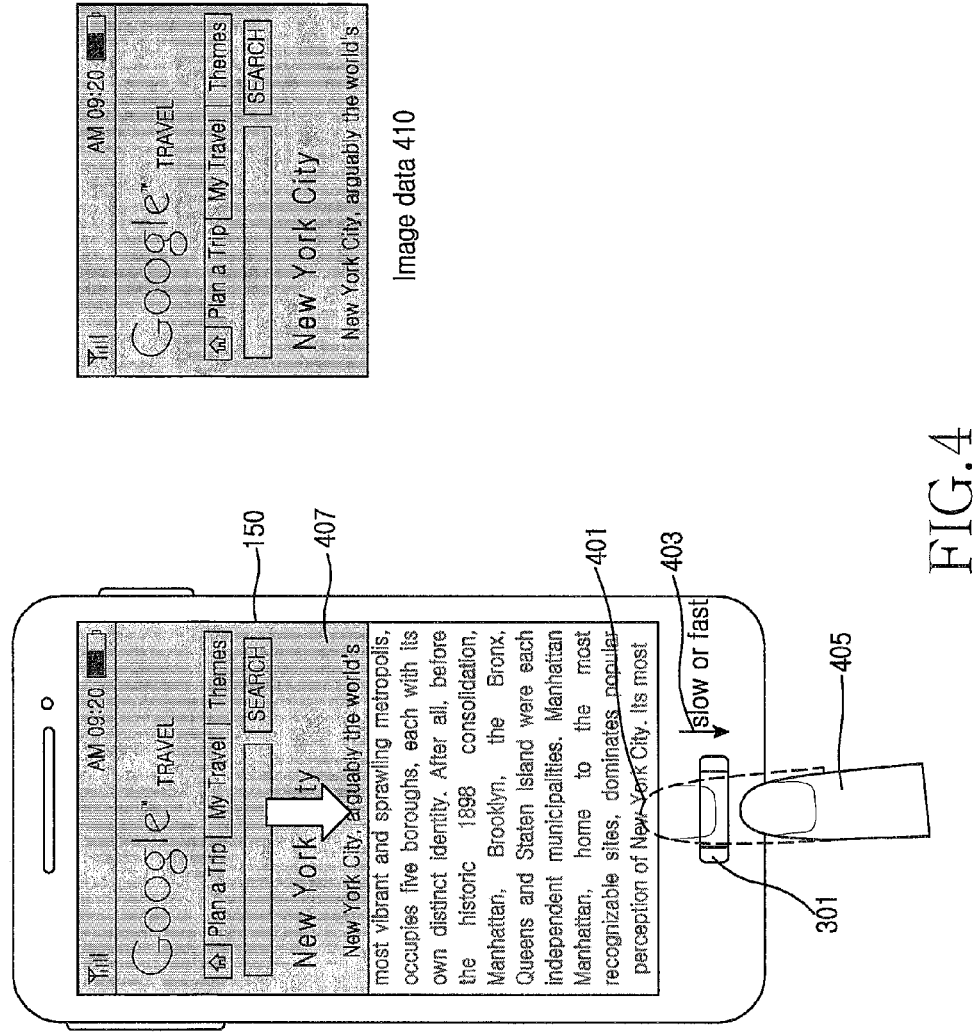
FIG. 4 illustrates an operation of capturing an image through a fingerprint sensing module 301 in an electronic device 101 according to various embodiments.

FIG. 4 illustrates an operation of capturing an image through a fingerprint sensing module 301 in an electronic device 101 according to various embodiments.

Referring to FIG. 4, the electronic device 101 can capture an entire or partial portion of a layer displayed on the display module 150 of the electronic device 101 according to a motion of swiping a finger on the fingerprint sensing module 301. According to an embodiment, the electronic device 101 can detect a contact of a finger of a user with the fingerprint sensing module 301 and detect a motion of swiping the finger in an up-to-down direction. When a speed at which the finger is swiped is determined as being equal to or less than a speed preset in the operation processing module 105, the electronic device 101 can increase a capture region 407 on the layer displayed on the display module 150 of the electronic device 101 in the up-to down direction according to the up-to-down direction in which the finger is swiped on the fingerprint sensing module 301. The electronic device 101 can detect that the contact of the finger with the fingerprint sensing module 301 is released and capture the capture region 407 corresponding to a time point at which the contact of the finger is released.

According to an embodiment, the electronic device 101 can perform an operation of acquiring a fingerprint input through the fingerprint sensing module 301 along with the operation of determining the capture region of the layer displayed on the display module 150 of the electronic device 101 when the finger is swiped on the fingerprint sensing module 301. According to an embodiment, the electronic device 101 can detect a motion of stopping swiping a finger when the fingerprint side of the finger is swiped down 401 to up 405 (for example, in an up-to-down direction on the fingerprint sensing module 301) to determine the capture region of the layer displayed on the display module 150. The electronic device 101 can stop the operation of increasing the capture region 407 of the layer displayed on the display module 150 in response to detection of the motion (the motion of stopping swiping the finger).

According to an embodiment, the electronic device 101 can detect a motion of swiping the finger in the down-to up direction on the fingerprint sensing module 301 and then swiping the finger in the opposite direction (for example, in an up-to-down direction) without releasing the contact of the finger. The electronic device 101 can decrease the capture region 407, which is being increased on the layer displayed on the display module 150, in a down-to-up direction as viewed from the capture region, in response to the detection.

According to an embodiment, the electronic device 101 can control a speed at which the capture region is increased or decreased according to a swipe speed of the finger on the fingerprint sensing module. According to an embodiment, when a user touches a finger on the fingerprint sensing module 301 and starts to swipe the finger, the electronic device 101 can detect a swipe speed of the finger and determine a change in the swipe speed of the finger based on the detected speed. The electronic device 101 can control a speed at which the capture region is increased or decreased on the layer displayed on the display module 150 based on the swipe speed of the finger on the fingerprint sensing module 301.

According to an embodiment, the electronic device 101 can determine the capture region when the contact of the finger with the fingerprint sensing module 301 is released. According to an embodiment, the electronic device 101 can detect that the contact of the finger with the fingerprint sensing module 301 is released and capture the capture region at a time point at which the contact is released. The electronic device 101 can store an image corresponding to the determined capture region 407 as separate image data 401.

Figure 5A:
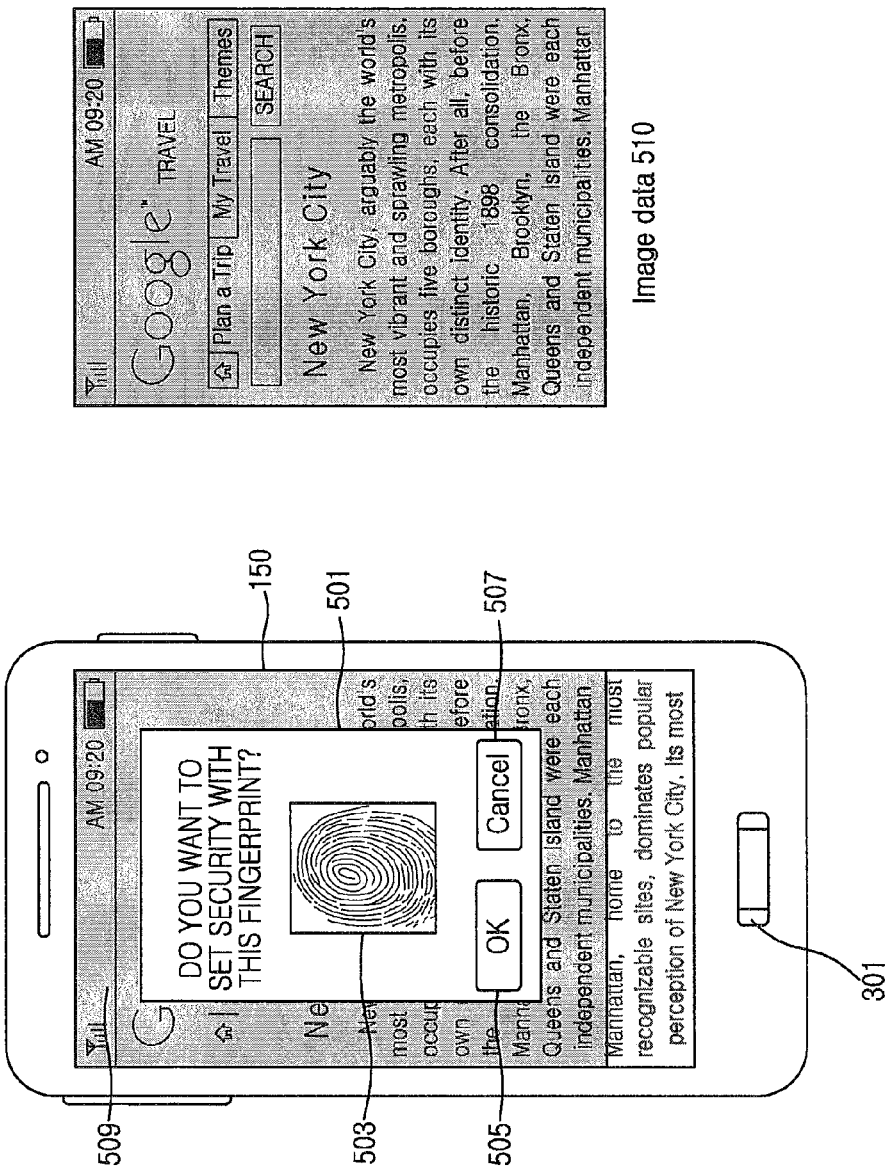
FIGS. 5A and 5B illustrate operations of processing a captured image in an electronic device according to various embodiments.
Figure 5B:
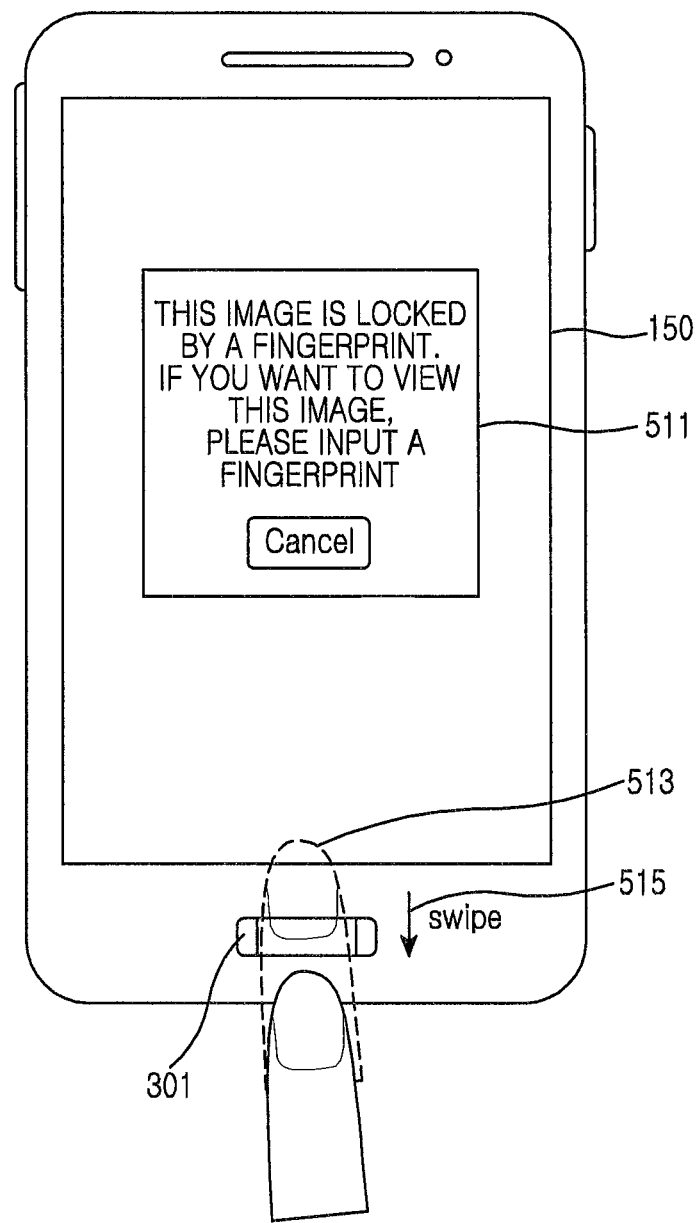

FIGS. 5A and 5B illustrate an operation of processing a captured image in an electronic device 101 according to various embodiments.

The electronic device 101 can set security for image data using fingerprint information acquired when the image data is generated by capturing an entire or partial region on the layer displayed on the display module 150.

Various embodiments of the present disclosure will be described below with reference to FIG. 5A.

Referring to FIG. 5A, the electronic device 101 can set the fingerprint information, that is acquired when the image data is generated by selecting an entire or partial region on the layer displayed on the display module 150, as an identification code for allowing for viewing the image data. According to an embodiment, when the contact of the finger on the fingerprint sensing module 301 is released, the electronic device 101 can store the capture region at a time point at which the contact is released as image data. When storing the capture region 509 as the image data, the electronic device 101 can determine whether to include fingerprint information acquired in the image data. The electronic device 101 can display the fingerprint information 503 acquired when the capture region 509 is stored through a pop-up window 501, and display a menu for enabling a user to determine whether to set the fingerprint information 503 as an identification code for viewing the image data 510 corresponding to the capture region 509, along with the fingerprint information 503. The electronic device 101 can set the fingerprint information 503 acquired along with the determined capture region 509 as an identification code for the image data 510 through selection of one of selectable icons (for example, "OK" 505 and "Cancel" 507) displayed together when setting whether to set an identification code for security of the image data 510 generated by storing the capture region 509.

Various embodiments of the present disclosure will be described below with reference to FIG. 5B.

Referring to FIG. 5B, the electronic device 101 can require a user to enter fingerprint information when the image data captured through the fingerprint sensing module 301 is requested. According to an embodiment, the electronic device 101 can set the fingerprint information that is scanned when the image data is captured by using the fingerprint sensing module 301 as the identification code for viewing the captured image data. When displaying the image on the display module 150, the electronic device 101 can request a user to input the identification code (for example, a fingerprint set for the image) through the fingerprint sensing module 301 and display the image data on the display module 150 when the input identification code is identical to the set fingerprint information.

An embodiment of checking an identification code set in image data is described with reference to FIG. 5. The electronic device 101 can display message "The image is locked by a fingerprint. If you want to view this image, please input a fingerprint" (511) when the image data for which security is set by using the fingerprint information is requested for viewing. When detecting a motion of swiping a finger on the fingerprint sensing module 301 (for example, a motion of touching (513), swiping (505), and releasing the contact of a finger with the fingerprint sensing module 301), the electronic device 101 can acquire a fingerprint corresponding to the finger. The electronic device 101 can compare the fingerprint information set in the image data with the fingerprint, and, when the fingerprint information is identical to the fingerprint, provide the image.

The electronic device 101 can set fingerprint information acquired by a swiping motion on the fingerprint sensing module 301 as the identification information as an identification code for one or more images (for example, the capture image) acquired by the swiping motion and provide the image when fingerprint information identical to the set fingerprint information is input for image viewing.

Figure 6:
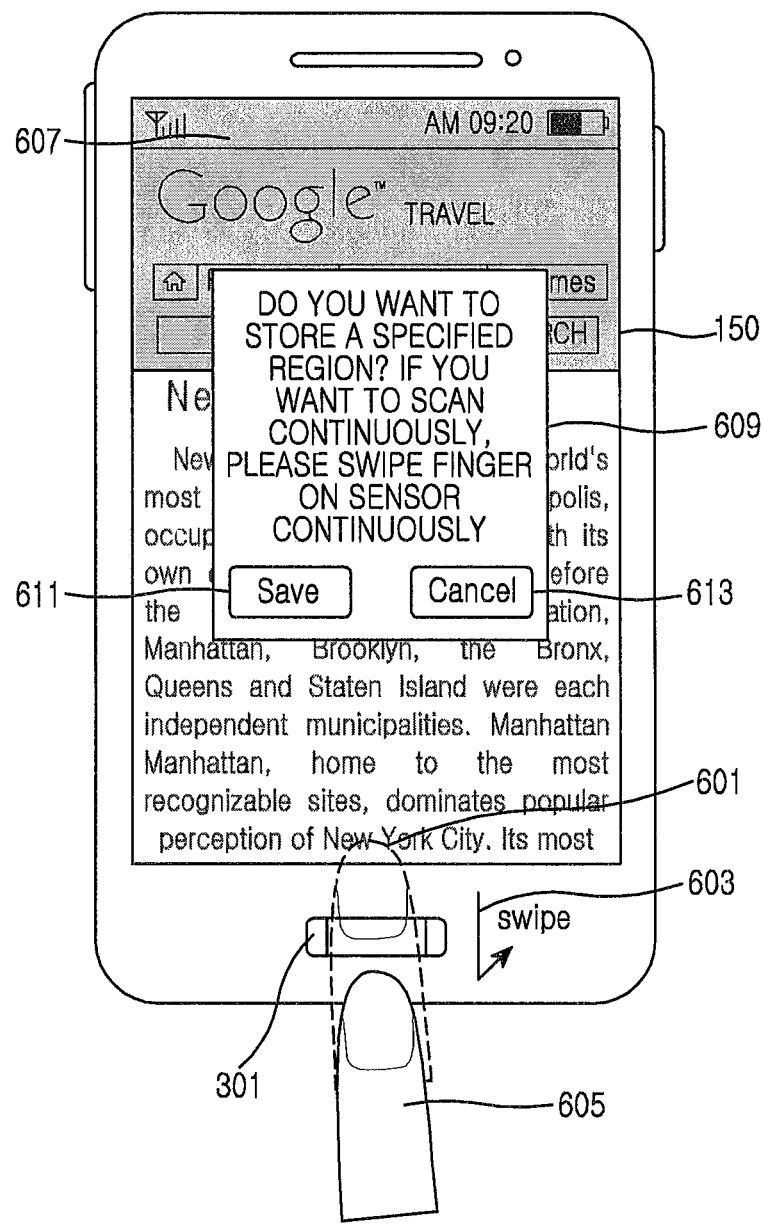
FIG. 6 illustrates an operation of viewing a stored image in an electronic device 101 according to various embodiments.

FIG. 6 illustrates an operation of viewing a stored image in an electronic device 101 according to various embodiments.

Referring to FIG. 6, when a finger is swiped on the fingerprint sensing module 301, the electronic device acquires fingerprint information and selects a certain region on a layer displayed on the display module 150. In this case, when the contact of the finger with the fingerprint sensing module 301 is released, the electronic device 101 can store an image corresponding to a certain region determined at a time point which the contact of the finger is released. When the finger is again swiped on the fingerprint sensing module 301, the electronic device 101 can continuously perform the operation of selecting a certain region on the layer displayed on the display module 150. According to an embodiment, the electronic device 101 can acquire the fingerprint information and select a certain region on the layer displayed on the display module 150 corresponding to the swiping motion by detecting the swiping motion of the finger 301 on a fingerprint sensing area. The electronic device 101 can detect that the contact of the finger which is being swiped is released from the fingerprint sensing module during acquirement of fingerprint information and selection of the certain region on the layer displayed on the display module. The electronic device 101 can compare the acquired fingerprint information and/or the determined certain region with information set in the operation processing module 105. The electronic device 101 can determine whether the acquired fingerprint information and/or the determined certain region satisfy a condition set in the operation processing module 105 (for example, whether fingerprint information including a specified region is acquired, or whether an area equal to or larger than a predetermined region is determined on the layer displayed on the display module). When the acquired fingerprint information and/or the determined certain region do not satisfy the condition set in the operation processing module 105, the electronic device can provide a menu of determining whether to store an image included in the certain region currently acquired on the layer displayed on the display module 150 like "Do you want to store the specified region, or if you want to continuously perform scan, please swipe sensors continuously 609", or whether to change the certain region determined on the layer displayed on the display module 150. When re-swiping 605 of a finger is detected through the fingerprint sensing module 301, the electronic device 101 can additionally detect fingerprint information or change the certain region currently acquired on the layer displayed on the display module 150. When selection of an icon "ok" 611 is detected, the electronic device 101 can store the currently detected fingerprint information and an image included in the acquired certain region. When an icon "cancel" 613 is selected, the electronic device 101 can end the embodiment without storing the currently detected fingerprint information and an image included in the acquired certain region.

Figure 7:
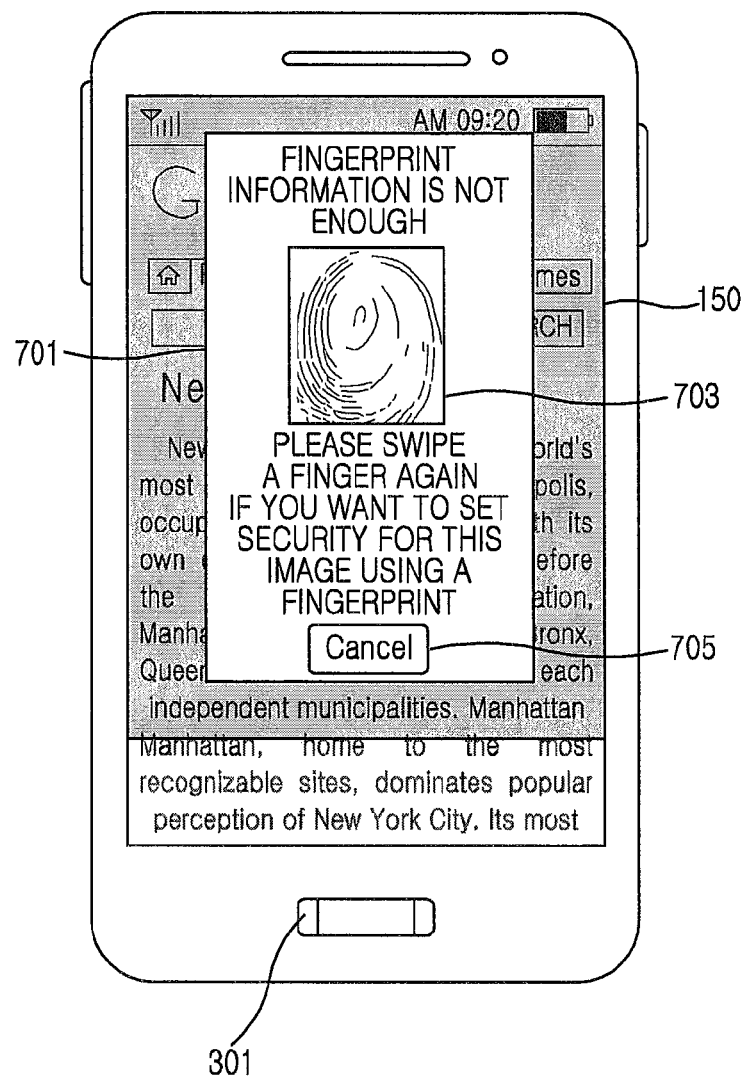
FIG. 7 illustrates an operation of applying acquired fingerprint information to an acquired image in an electronic device 101 according to various embodiments.

FIG. 7 illustrates an operation of applying acquired fingerprint information to an acquired image in an electronic device 101 according to various embodiments.

Referring to FIG. 7, when detecting a motion of swiping a finger on the fingerprint sensing module 301, the electronic device 101 can set acquired fingerprint information as an identification code for image data acquired along with the fingerprint information. When the fingerprint information is inadequate to be used as the identification code, the electronic device 101 can provide a service of requesting re-input of the fingerprint information. According to an embodiment, when the fingerprint information acquired through the fingerprint sensing module 301 does not satisfy a predetermined condition (for example, whether a fingerprint on a specified region is included or whether a fingerprint equal to or larger than a specified area is included) that the acquired fingerprint information is used as the identification code, the electronic device 101 can display the acquired fingerprint information 703 through a pop-up window 701 on the display module 150. The electronic device 101 can provide a menu (for example, including sentence "please, swipe a finger again to set security for the image using a fingerprint) of requesting re-input of a relevant fingerprint on the pop-up window 703 on which the fingerprint information 703 is displayed. When the acquired fingerprint information satisfies the predetermined condition, the electronic device 101 can set the acquired fingerprint information as the identification code for releasing security of an image corresponding to a certain determined region on the layer displayed on the display module 150.

Figure 8:
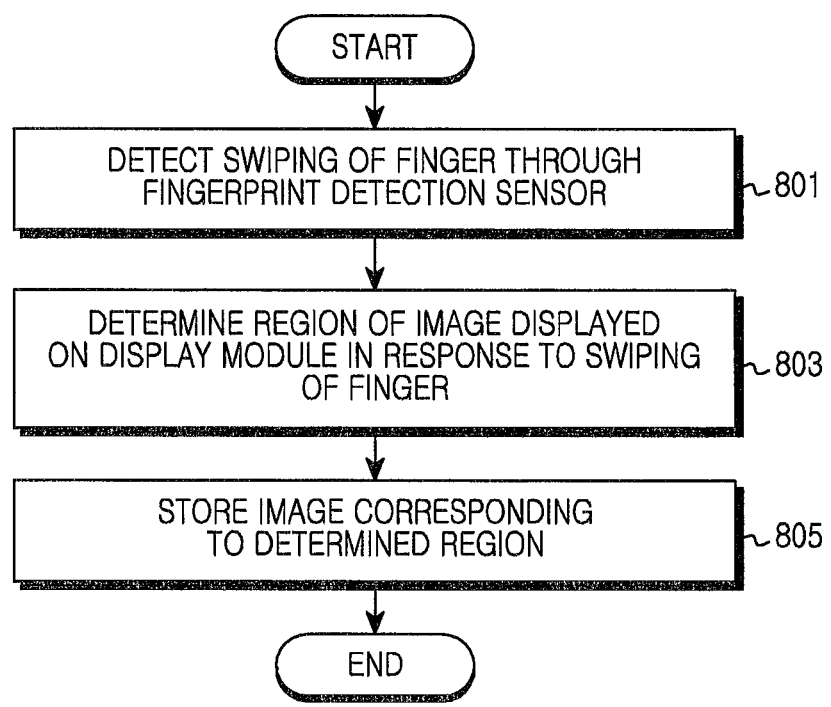
FIG. 8 is a flowchart illustrating an operation of capturing an image using a fingerprint sensing module 301 in an electronic device 101 according to various embodiments.

FIG. 8 is a flowchart illustrating an operation of capturing an image using a fingerprint sensing module 301 in an electronic device 101 according to various embodiments.

When the electronic device 101 acquires fingerprint information of a finger through the fingerprint sensing module 301, the electronic device 101 can capture the fingerprint information and/or an entire or partial region of an image displayed on the display module 150 at a time point which the fingerprint information is acquired.

In operation 801, the electronic device 101 can acquire the fingerprint information input through the fingerprint sensing module (fingerprint detection sensor) 301. When a motion of swiping a finger on the fingerprint sensing module 301 is detected, the electronic device 101 can acquire the fingerprint information corresponding to a region of the fingerprint sensing module 301 on which the finger is swiped.

In operation 803, the electronic device 101 can specify a capture region on a layer displayed on the display module 150 according a swiping direction of the finger detected by the fingerprint sensing module 301. According to an embodiment, the electronic device 101 can detect a motion of swiping the fingerprint side of the finger in an up-to-down direction as viewed from a plane surface of the fingerprint sensing module 301. When detecting the swiping motion, the electronic device 101 can specify an image region to be captured in the up-to-down direction on the layer displayed on the display module 150. The electronic device 101 can acquire the fingerprint information corresponding to the fingerprint side of the finger that is swiped on the fingerprint sensing module 301 during the motion of swiping the finger on the fingerprint sensing module 301 and acquire an image corresponding to the specified region to be captured corresponding to the fingerprint side that is swiped on the fingerprint sensing module 301.

According to an embodiment, the electronic device 101 can detect a change in a swiping direction when the fingerprint side of the finger is swiped in the up-to-down direction as viewed from the plane surface of the fingerprint sensing module 301 and is then swiped in a down-to-up direction while the contact of the finger is being maintained. When the electronic device 101 detects the change in the swiping direction of the finger on the fingerprint sensing module 301 from the up-to-down direction to the down-to-up direction while increasing the image region to be captured on the layer displayed on the display module 150 in the up-to-down direction, the electronic device 101 can decrease the image region to be captured on the layer displayed on the display module 150 in the down-to-up direction.

When detecting that the contact of the finger that is swiped on the fingerprint sensing module 301 is released, the electronic device 101 can store the acquired fingerprint information and store an image corresponding to a region specified on the layer displayed on the display module 150 in operation 805. The electronic device 101 can set the acquired fingerprint information as an identification code for releasing a security environment at the time of image viewing when storing the image corresponding to the specified region. In a case where the fingerprint information is registered as the identification code, the electronic device 101 can display a notification of requesting re-input of fingerprint information when the fingerprint information does not satisfy a condition that the fingerprint is used as the identification code.

The electronic device 101 can terminate the embodiment of FIG. 8 when the operation 805 is performed.

Figure 9:
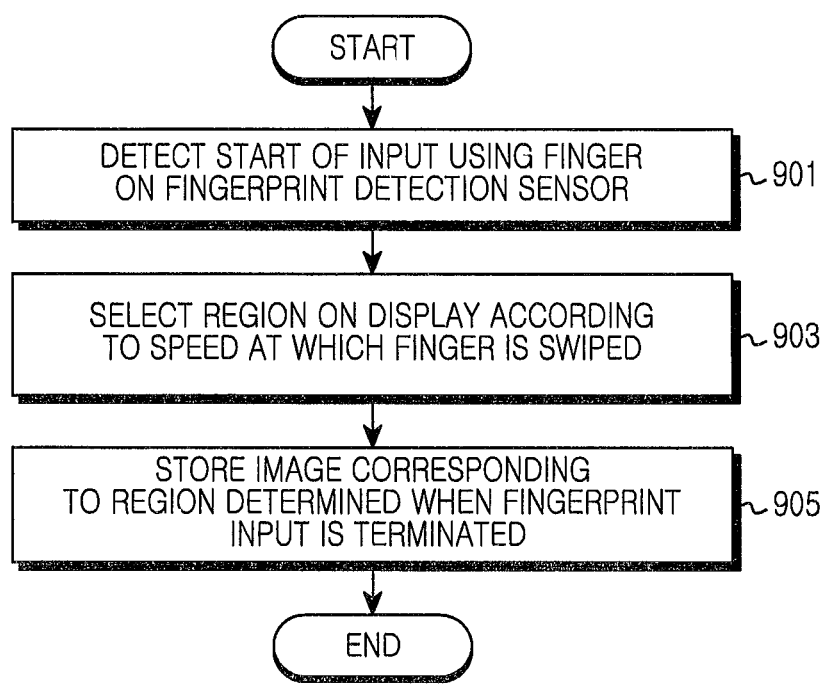
FIG. 9 is a flowchart illustrating an operation of capturing an image using a fingerprint sensing module 301 in an electronic device 101 according to various embodiments.

FIG. 9 is a flowchart illustrating an operation of capturing an image using a fingerprint sensing module 301 in an electronic device 101 according to various embodiments.

When the electronic device 101 acquires fingerprint information of a finger through the fingerprint sensing module 301, the electronic device 101 can capture the fingerprint information and/or an entire or partial region of an image displayed on the display module 150 at a time point which the fingerprint information is acquired.

In operation 901, the electronic device 101 can acquire the fingerprint information input through the fingerprint sensing module (fingerprint detection sensor) 301. When a motion of swiping a finger on the fingerprint sensing module 301 is detected, the electronic device 101 can acquire the fingerprint information corresponding to a region of the fingerprint sensing module 301 on which the finger is swiped. The electronic device 101 can detect a swipe speed of the finger on the fingerprint sensing module 301.

When the detected swipe speed is equal to or greater than a preset speed, the electronic device 101 can capture an image corresponding to the entire region of the layer displayed on the display module 150 in operation 903. According to another embodiment, when the detected swipe speed is less than the preset speed, the electronic device 101 can capture an image corresponding to the entire or a partial region of the layer displayed on the display module 150. The electronic device 101 can control a speed at which a capture region is increased or decreased on the layer displayed on the display module 150 according to the detected swipe speed. According to an embodiment, the electronic device 101 can detect swiping of a finger in an up-to-down direction as viewed from a plane surface of the fingerprint sensing module 301 and, when the swipe speed is less than the preset speed, start to increase the capture region from an upper end of the layer displayed on the display module 150. The electronic device 101 can set a speed at which the capture region is increased to a preset speed corresponding to the swipe speed. The electronic device 101 can detect a change in the swipe speed of the finger during swiping on the fingerprint sensing module 301 and set the speed at which the capture region is increased to the preset speed corresponding to the detected speed.

When a contact of the finger that is swiped on the fingerprint sensing module 301 is released, the electronic device can store the acquired fingerprint information and/or the acquired image for the capture region in operation 905. The electronic device 101 can set the acquired fingerprint information as an identification code for releasing a security environment at the time of image viewing when the image corresponding to a specified region is stored. In a case where the fingerprint information is registered as the identification code, the electronic device 101 can display a notification of requesting re-input of fingerprint information when the fingerprint information does not satisfy a condition that the fingerprint is used as the identification code.

The electronic device 101 can terminate the embodiment of FIG. 9 when the operation 905 is performed.

According to various embodiments, a method of operating an electronic device can include detecting fingerprint information of a swiped finger, and acquiring the fingerprint information and acquiring a partial or entire region of an image currently displayed on the electronic device according to a swiping pattern.

According to various embodiments, detecting the fingerprint information can include detecting swiping of a finger in an up-to-down direction, a down-to-up direction, a left-to-right direction, or a right-to-left direction on a plane surface of the fingerprint sensing module.

According to various embodiments, acquiring the image can include acquiring the entire or partial region of the image at a swipe speed.

According to various embodiments, acquiring the image can include determining a speed at which the region of an image to be acquired is selected according to a swipe speed.

According to various embodiments, acquiring the image can include decreasing a selected region of the image when a swiping direction switches from a first direction to the second direction.

According to various embodiments, the fingerprint information can be set as an identification code for viewing the acquired image. According to an embodiment, the method of operating the electronic device can further include an operation of providing the image when the identification code is input upon viewing the image.

According to various embodiments, when the fingerprint information does not include a fingerprint of a specified region of a finger, the method can include performing control to re-input the fingerprint information.

According to various embodiments, the method of operating the electronic device can further include displaying a screen for determining whether to continuously perform image acquirement when the swiping is released.

According to various embodiments, acquiring the fingerprint information includes continuously increasing or decreasing a selected region of the image when a second swiping is performed consecutively to the swiping within a predetermined period of time after the swiping is released.

Figure 10:
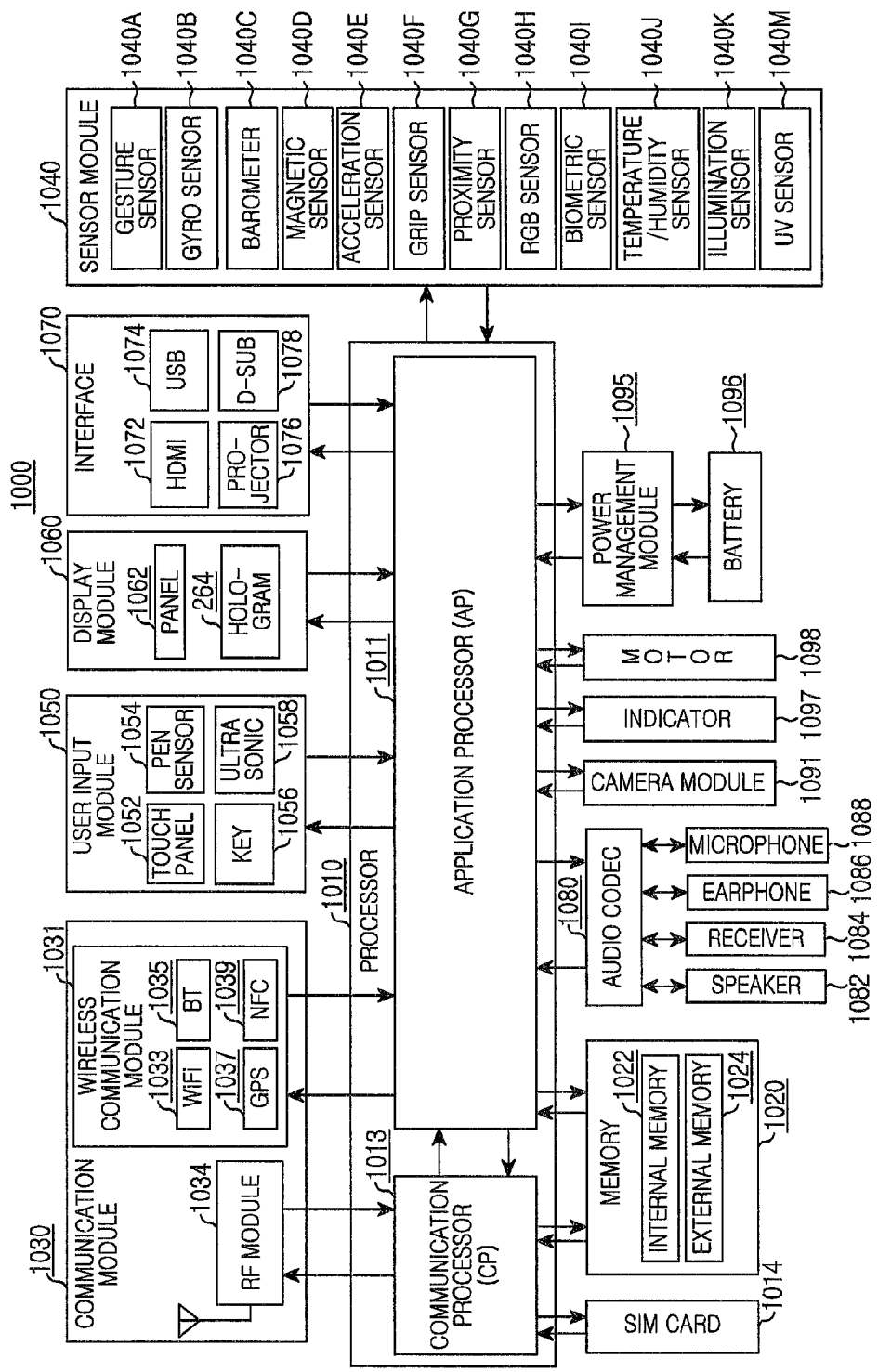
FIG. 10 illustrates a block diagram of hardware 1000 according to various embodiments.

FIG. 10 illustrates a block diagram of hardware 1000 according to various embodiments of the present disclosure.

The hardware 100 can configure all or some of, for example, the electronic device 101 illustrated in FIG. 1. Referring to FIG. 10, the hardware 1000 can include at least one processor 1010, a subscriber identity module (SIM) card 1014, a memory 1020, a communication module 1030, a sensor module 1040, a user input module 1050, a display module 1060, an interface 1070, an audio codec 1080, a power management module 1095, a battery 1096, an indicator 1097, or a motor 1098.

The processor 1010 (for example, the processor 120) can include one or more application processor (AP) 1011 or one or more communication processor (CP) 1013. The processor 1010 can be, for example, the processor 120 illustrated in FIG. 1. Although the AP 1011 and the CP 1013 are illustrated as being included in the processor 1010 in FIG. 10, the AP 1010 and the CP 1013 can be respectively included in different IC packages. According to an embodiment, the AP 1011 and the CP 1013 can be included in one IC package.

The AP 1011 can execute an operating system or application programs to control a plurality of hardware or software elements connected to the AP 1011 and perform data processing and data operations on various types of data including multimedia data. The CP 1011 can be implemented by, for example, an SoC. According to an embodiment, the processor 1010 can further include a graphic processing unit (GPU) (not illustrated).

The CP 1013 can perform a function of managing data links for communication between an electronic device (for example, the electronic device 101) including the hardware 1000 and other electronic devices connected to the electronic device through networks and a function of converting communication protocols. The CP 1013 can be implemented by, for example, an SoC. According to an embodiment, the CP 1013 can perform at least one of multimedia control functions. The CP 1013 can perform terminal identification and authentication using, for example, a subscriber identification module (for example, the SIM card 1014) within a communication network. In addition, the CP 1013 can provide services, such as a voice call, a video call, a text message, or packet data, to a user.

In addition, the CP 1013 can control the data transmission and reception of the communication module 1030. Although the elements, such as the CP 1013, the power management module 1095, or the memory 1020, are illustrated as being provided separately from the AP 1011 in FIG. 10, the AP 1011 can be implemented to include at least one (for example, the CP 1011) of the above-described elements according to an embodiment.

According to an embodiment, the AP 1011 and the CP 1013 can load a command or data received from at least one of a nonvolatile memory and another element connected to the AP 1011 or the CP 1013 into a volatile memory, and process the same. In addition, the AP 1011 or the CP 1013 can store data received from or generated by at least one of other elements in the nonvolatile memory.

The SIM card 1014 can be a card implementing a subscriber identity module or can be inserted into a slot formed at a specific position of the electronic device. The SIM card 1014 can include unique identification information (for example, integrated circuit card identifier (ICCID)) or subscriber information (for example, international mobile subscriber identity (IMSI)).

The memory 1020 can include an internal memory 1022 or an external memory 1024. The memory 1020 can be, for example, the memory 130 illustrated in FIG. 1. The internal memory 1022 can include at least one of a volatile memory (for example, DRAM, SRAM, or SDRAM) or a nonvolatile memory (for example, OTPROM, PROM, EPROM, EEPROM, mask ROM, flash ROM, NAND flash memory, or NOR flash memory). According to an embodiment, the internal memory 1022 can have a solid state drive (SSD) type. The external memory 1024 can further include a flash drive, for example, CF, SD, Micro-SD, Mini-SD, xD or Memory Stick.

The communication module 1030 can include a wireless communication module 1031 or an RF module 1034. The communication module 1030 can be, for example, the communication module 170 illustrated in FIG. 1. The wireless communication module 1031 can include, for example, a WiFi module 1033, a Bluetooth (BT) module 1035, GPS 1037 or a near field communication (NFC) module 1039. For example, the wireless communication module 1031 can provide a wireless communication function by using radio frequencies. Additionally or alternatively, the wireless communication module 1031 can include a network interface (for example, LAN card) or a modem that connects the hardware 100 to a network (for example, Internet, LAN, WAN, telecommunication network, cellular network, satellite network or POTS).

The RF module 1034 can perform transmission and reception of data, for example, transmission and reception of RF signals or requested electronic signals. Although not illustrated, the RF module 1034 can include, for example, a transceiver, a PAM, a frequency filter, or a LNA. The RF module 1034 can further include a component for transmitting and receiving electromagnetic waves in free space for wireless communication, for example, a conductor or a conductive line.

The sensor module 1040 can include at least one of, for example, a gesture sensor 1040A, a gyro sensor 1040B, a barometer 1040C, a magnetic sensor 1040D, an acceleration sensor 1040E, a grip sensor 1040F, a proximity sensor 1040G, a RGB (red-green-blue) sensor 1040H, a biometric sensor 1040I, a temperature/humidity sensor 1040J, a illuminance sensor 1040K, and an ultra violet (UV) sensor 1040M. The sensor module 1040 can measure a physical amount or detect an operating state of the electronic device and convert measured or detected information into an electrical signal. Additionally/alternatively, the sensor module 1040 can include, for example, an E-nose sensor (not illustrated), an electromyography (EMG) sensor (not illustrated), an electroencephalogram (EEG) sensor, (not illustrated), an electrocardiogram (ECG) sensor (not illustrated) or a fingerprint sensor. The sensor module 1040 can further include a control circuit for controlling at least one sensor included therein.

The user input module 1050 can include a touch panel 1052, a (digital) pen sensor 1054, a key 1056, or an ultrasonic input device 1058. The user input module 1050 can be, for example, the user input module 140 illustrated in FIG. 1. The touch panel 1052 can recognize a touch input using at least one method of, for example, a capacitive method, a resistive method, an infrared method, and an ultrasound method. In addition, the touch panel 1052 can further include a controller (not illustrated). In the case of the capacitive method, not only direct touch but also proximity recognition are possible. The touch panel 1052 can further include a tactile layer. In this case, the touch panel 1052 can provide a tactile response to a user.

The (digital) pen sensor 1054 can be implemented by using, for example, a method identical or similar to a method for receiving a touch input or a separate recognition sheet. For example, a keypad or a touch key can be used as the key 1056. The ultrasonic input device 1058 is a device for detecting a sound wave using a microphone (for example, the microphone 1088) and identifying data in a terminal, through a pen for generating an ultrasound signal to facilitate wireless recognition. According to an embodiment, the hardware 1000 can receive a user input from an external device (for example, a network, a computer, or a server) connected thereto by using the communication module 1030.

The display module 1060 can include a panel 1062 and a hologram 1064. The display module 1060 can be, for example, the display module 150 illustrated in FIG. 1. The panel 1062 can be, for example, a LCD panel or an AM-OLED panel. The panel 1062 can be implemented to be, for example, flexible, transparent, or wearable. The panel 1062 can be formed as one module with the touch panel 1052. The hologram 1064 can enable a 3D image to be viewed in space using optical interference. According to an embodiment, the display module 1060 can further include a control circuit for the panel 1062 and the hologram 1064.

The interface 1010 can include, for example, a HDMI 1012, an USB 1014, a projector 1016, or a D-sub 1018. Additionally or alternatively, the interface 1010 can include, for example, a SD/MMC (not illustrated), or an IrDA (not illustrated).

The audio codec 1080 can perform conversion between voice and electrical signals. The audio codec 1080 can perform conversion of voice information input or output through, for example, a speaker 1082, a receiver 1084, an earphone 1086, or the microphone 1088.

The camera module 1091 is a device for photographing an image and moving images. According to an embodiment, the camera module 191 can include at least one image sensor (for example, a front lens or a rear lens), an image signal processor (ISP) (not illustrated), or an flash LED (not illustrated).

The power management module 1095 can manage power of the hardware 1000. Although not illustrated, the power management module 1095 can include, for example, a power management IC (PMIC), a charger IC, or a battery gage.

The PMIC can be mounted within, for example, an integrated circuit or a SoC semiconductor. A charging method can include a wired charging method and a wireless charging method. The charger IC can charge a battery and prevent the application of overvoltage or over-current from a charger. According to an embodiment, the charger IC can include a charger IC for at least one of a wired charging method or a wireless charging method. The wireless charging method can include, for example, a magnetic resonance method, a magnetic induction method, or an electromagnetic wave method. For example, an additional circuit for wireless charging, for example, a coil loop, a resonance circuit, or a rectifier can be included.

A battery gage can measure, for example, an amount of power remaining or a voltage, a current, or a temperature during charging with respect to the battery 1096. The battery 1096 can generate electricity and supply power and can be, for example, a rechargeable battery.

The indicator 1097 can represent a specific state of the hardware 1000 or an element (for example, the AP 1011) of the hardware 1000, for example, a booting state, a message state, or a charge state. The motor 1098 can convert an electrical signal into mechanical vibration. The MCU 1099 can control the sensor module 1040.

Although not illustrated, the hardware 1000 can include a processing device (for example, a GPU) for supporting a mobile TV. The processing device for supporting a mobile TV can process media data compliant with, for example, a DMB, DVB or media flow standard. Each of the above-descried elements of the hardware according to the present disclosure can be configured by one or more components and the name of each element can vary depending on the type of an electronic device. The hardware according to the present disclosure can be configured by including at least one of the above-described elements. Some elements can be omitted from, or additional other elements can be further included in the hardware. When some of the elements of the hardware according to the present disclosure are combined into one entity, the one entity can perform the functions of the elements before combination.

According to various embodiments, an electronic device includes a memory for storing one or more pieces of fingerprint information acquired through a fingerprint sensing module, an operation processing module for detecting fingerprint information of a swiped fingerprint, acquiring the fingerprint information, and acquiring a partial or entire region of an image currently displayed on the electronic device according to a swiping pattern, through the fingerprint sensing module, and at least one processor for controlling the operation processing module.

According to various embodiments, the operation processing module can detect swiping of a fingerprint side of a finger in a up-to-down direction, a down-to-up direction, a left-to-right direction or a right-to-left direction on a plane surface of the fingerprint sensing module.

According to various embodiments, the operation processing module can acquire the entire or partial portion of the image according to a swipe speed.

According to various embodiments, the operation processing module can determine a speed at which a region of the image is selected according to a swipe speed.

According to various embodiments, the operation processing module can decrease a selected region of the image when a swiping direction switches from a first direction to a second direction.

According to various embodiments, the operation processing module can set the fingerprint information as an identification code for viewing the image.

According to various embodiments, the operation processing module can provide the image when the identification code is input for viewing the image.

According to various embodiments, the operation processing module can request re-input of the fingerprint information when the fingerprint information does not include a specified region of a fingerprint of a finger.

According to various embodiments, the operation processing module can display a screen for determining whether to continuously perform image acquirement when the swiping is released.

According to various embodiments, the operation processing module can continuously increase or decrease a selected region of the image when a second swiping is performed consecutively to the swiping within a predetermined period of time after the swiping is released.

According to the various embodiments of the present disclosure, the electronic device provides the function of capturing an image based on touch information of the sensor of detecting a fingerprint, improving utility of the sensor for detecting the fingerprint and convenience to a user to perform control functions.

The term "module" as used herein can refer to a unit including one or a combination of two or more among, for example, hardware, software and firmware. The term "module" can be equally exchangeable with the term "unit", "logic", "logical block", "component", or "circuit". The "module" can be a smallest unit or part of an integrally formed component. The "module" can be a smallest unit or a part thereof which performs one or more functions. The "module" can be implemented mechanically or electronically. For example, the "module" according to the present disclosure can include at least one of an ASIC chip, FPGAs, or a programmable logic device that perform certain operations that are well known present or later-developed.

According to various embodiments, at least a part of the apparatus (for example, modules or functions thereof) or the method (for example, operations) according to the present disclosure can be implemented by instructions stored in a computer-readable storage media as a programming module for example. When the instructions are executed by one or more processors (for example, the processor 1011), the processor can perform functions corresponding to the instructions. The computer-readable storage media can be, for example, the memory 1020. At least a part of the programming module can be implemented (for example, executed) by the processor 1011 for example. At least a part of the programming module can include, for example, a module, an application, a routine, a set of instructions and/or a process which performs one or more functions.

The programming module according to the present disclosure can include one or more elements among the above-described elements or emit some elements among the above-described elements, or further include another element. The operations performed by the programming module or another element according to the present disclosure can be performed in a sequential manner, a parallel manner, a repetitive manner, or a heuristic manner. Furthermore, some operations can be performed in another order or be omitted, or another operation can be included.

Examples of the computer-readable recording medium can include magnetic recording media, such as hard disks, floppy disks, and magnetic tapes, optical recording media such as CD-ROMs and DVDs, magneto-optical recording mediums such as floptical disks, and hardware devices such as ROMs, RAMs and flash memories that are especially configured to store and execute application commands (for example, programming module). The application commands can include machine language codes that can be generated by a compiler, and high-level language codes that can be executed by a computer by using an interpreter. The hardware apparatus can be configured to operate as one or more software modules in order to perform operations according to the present disclosure, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method in an electronic device, the method comprising:
    displaying, by a screen, an image on a screen;
    detecting, by at least one processor, a swiping of a finger on a fingerprint sensor using the fingerprint sensor;
    determining, by the at least one processor, at least a portion of the displayed image to be captured, according to the swiping of the finger on the fingerprint sensor; and
    capturing, by the at least one processor, the determined at least the portion of the displayed image in response to detecting a release of the swiping of the finger; and
    storing, by the at least one processor, the captured at least the portion of the displayed image in a memory.

2. The method of claim 1, wherein the finger is swiped in one of an up-to-down direction, a down-to-up direction, a left-to-right direction or a right-to-left direction.

3. The method of claim 1, wherein a size of the image is determined according to a speed of the swiping of the finger.

4. The method of claim 3, wherein the size of the determined at least the portion of the displayed image is increased as the speed of the swipe of the finger is faster.

5. The method of claim 1, wherein a size of the determined at least the portion of the displayed image is decreased when a direction of the swiping switches from a first direction to a second direction.

6. The method of claim 1, further comprising
    scanning, by the fingerprint sensor, a fingerprint of the finger; and
    setting the scanned fingerprint acquired from the finger as an identification code for unlocking the stored at least the portion of the displayed image.

7. The method of claim 6, further comprising providing an image of the fingerprint when the finger is swiped for unlocking the stored at least the portion of the displayed image.

8. The method of claim 1, further comprising requesting for a re-swiping the finger when the fingerprint information does not include a specified region of a fingerprint of a finger.

9. The method of claim 1, further comprising inquiring a user to confirm whether to use the scanned fingerprint as an identification code when the finger is released off the fingerprint sensor.

10. The method of claim 1, further comprising increasing or decreasing the determined at least the portion of the displayed image when a second swiping is performed within a predetermined period of time after the swiping is released.

11. An electronic device, comprising:
a memory configured to store one or more pieces of fingerprint information;
a fingerprint sensor;
a screen configured to display an image; and
at least one processor configured to:
  detect a swiping of a finger on the fingerprint sensor using the fingerprint sensor;
  determine at least a portion of the displayed image to be captured, according to the swiping of the finger on the fingerprint sensor;
  capture the determined at least the portion of the displayed image in response to detecting a release of the swiping of the finger; and
  store the captured at least the portion of the displayed image in the memory.

12. The electronic device of claim 11, wherein the finger is swiped in one of an up-to-down direction, a down-to-up direction, a left-to-right direction or a right-to-left direction.

13. The electronic device of claim 11, wherein a size of the image is determined according to a speed of the swiping of the finger.

14. The electronic device of claim 11, wherein the size of the determined at least the portion of the displayed image is increased as the speed of the swipe of the finger is faster.

15. The electronic device of claim 11, wherein a size of the determined at least the portion of the displayed image is decreased when a direction of the swiping switches from a first direction to a second direction.

16. The electronic device of claim 11, wherein the at least one processor is configured to cause the fingerprint sensor to scan a fingerprint of the finger and set the scanned fingerprint information as an identification code for unlocking the stored at least the portion of the displayed determined image.

17. The electronic device of claim 16, wherein the processor is configured to provide an image of the fingerprint on the screen when the finger is swiped.

18. The electronic device of claim 11, wherein the processor is configured to request for re-swiping the finger when the fingerprint is not valid.

19. The electronic device of claim 11, wherein the processor is configured to inquire a user to confirm whether to use the scanned fingerprint as an identification code when the finger is released off the fingerprint sensor.

20. The electronic device of claim 11, wherein the processor is configured to increase or decrease the determined at least the portion of the displayed image when a second swiping is performed within a predetermined period of time after the swiping is released.

* * * * *